US012229654B2

(12) United States Patent
Biswas et al.

(10) Patent No.: US 12,229,654 B2
(45) Date of Patent: Feb. 18, 2025

(54) HYBRID RECOMMENDATION SYSTEM AND METHODS BASED ON COLLABORATIVE FILTERING INTEGRATED WITH MULTIPLE NEURAL NETWORKS

(71) Applicant: Verizon Patent and Licensing Inc., Basking Ridge, NJ (US)

(72) Inventors: Pratik K. Biswas, Morganville, NJ (US); Songlin Liu, Homdel, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 967 days.

(21) Appl. No.: 17/243,247

(22) Filed: Apr. 28, 2021

(65) Prior Publication Data

US 2022/0351021 A1   Nov. 3, 2022

(51) Int. Cl.
*G06N 3/04*   (2023.01)
*G06F 17/16*   (2006.01)
*G06N 3/044*   (2023.01)
*G06N 3/045*   (2023.01)
*G06N 3/047*   (2023.01)
*G06N 3/08*   (2023.01)

(52) U.S. Cl.
CPC ............. *G06N 3/045* (2023.01); *G06F 17/16* (2013.01); *G06N 3/044* (2023.01); *G06N 3/047* (2023.01); *G06N 3/08* (2013.01)

(58) Field of Classification Search
CPC ....................................................... G06N 3/045
See application file for complete search history.

(56) References Cited

U.S. PATENT DOCUMENTS

| 10,824,940 | B1 * | 11/2020 | Rybakov | G06N 7/01 |
| 11,250,308 | B2 * | 2/2022 | Lee | G06N 3/084 |
| 2021/0081758 | A1 * | 3/2021 | Zadorojniy | G06N 3/08 |

(Continued)

OTHER PUBLICATIONS

Yu, Ruiyun, et al. "CFFNN: Cross feature fusion neural network for collaborative filtering." IEEE Transactions on Knowledge and Data Engineering 34.10 (2021): 4650-4662. (Year: 2021).*

(Continued)

*Primary Examiner* — Hal Schnee

(57) ABSTRACT

A hybrid recommendation system may generate recommendations, predictions, and/or classifications by applying collaborative filtering to influence Convolutional Neural Networks ("CNNs"), Recurrent Neural Networks ("RNNs"), and/or other neural networks that model characteristic, structural, sequential, contextual, interactive, and/or other relationships from interactions of different users. The system may provide different user interactions as input to a first neural network, and the first neural network may model relationships between the different users and different items based on the interactions. The system may track activities of one or more users, may use a personalized model, that is generated via collaborative filtering of the tracked activities, together with other models of the relationships to generate a recommendation matrix, and may modify a user interface to present recommended candidate items based on recommendation matrix vectors that rank the recommended candidate items higher than other items.

20 Claims, 11 Drawing Sheets

(56) References Cited

U.S. PATENT DOCUMENTS

| | | | | |
|---|---|---|---|---|
| 2021/0166103 A1* | 6/2021 | Jackson | ................. | G06N 3/042 |
| 2023/0040678 A1* | 2/2023 | Karlin | .................... | G06N 3/045 |

OTHER PUBLICATIONS

Gabriel De Souza, P. Moreira, Dietmar Jannach, and Adilson Marques Da Cunha. "Contextual hybrid session-based news recommendation with recurrent neural networks." IEEE Access 7 (2019): 169185-169203. (Year: 2019).*

Lekshmi Priya, T., and Harikumar Sandhya. "Matrix factorization for recommendation system." International Conference on Artificial Intelligence and Data Engineering. Singapore: Springer Nature Singapore, 2019. (Year: 2019).*

L. Zheng et al., "Joint Deep Modeling of Users and Items Using Reviews for Recommendation," Jan. 17, 2017 (available at https://www.researchgate.net/publication/312492565_Joint_Deep_Modeling_of_Users_and_Items_Using_Reviews_for_Recommendation, visited Apr. 14, 2021).

H. Guo et al., "DeepFM: A Factorization-Machine based Nueral Network for CTR Prediction," Mar. 13, 2017 (available at https://www.ijcai.org/proceedings/2017/0239.pdf, visited Apr. 14, 2021).

D. Almazro et al., "A Survey Paper on Recommender Systems," Dec. 24, 2010 (available at https://arxiv.org/pdf/1006.5278.pdf, visited Apr. 14, 2021).

S. Zhang et al., "Deep Learning based Recommender System: A Survey and New Perspectives," Jul. 10, 2019 (available at https://arxiv.org/pdf/1707.07435.pdf, visited Apr. 14, 2021).

J. Wei et al., "Collaborative Filtering and Deep Learning Based Hybrid Recommendation for Cold Start Problem," Nov. 26, 2020 (available at https://www.researchgate.net/publication/309149269_Collaborative_Filtering_and_Deep_Learning_Based_Hybrid_Recommendation_for_Cold_Start_Problem, visited Apr. 14, 2021).

R. Burke, "Hybrid Recommender Systems: Survey and Experiments," Nov. 2002 (available at https://www.researchgate.net/publication/263377228_Hybrid_Recommender_Systems_Survey_and_Experiments, visited Apr. 14, 2021).

S. Wu et al., "Personal Recommendation Using Deep Recurrent Neural Networks in NetEase," ISBN: 978-1-5090-2020-1, May 20, 2016 (available at https://cfm.uestc.edu.cn/~zhangdongxiang/papers/ICDE16_industry_231.pdf, visited Apr. 14, 2021).

* cited by examiner

HYBRID RECOMMENDATION SYSTEM AND METHODS BASED ON COLLABORATIVE FILTERING INTEGRATED WITH MULTIPLE NEURAL NETWORKS

BACKGROUND

Many decisions made on streaming sites, e-commerce sites, and/or other digital platforms may be driven in part by recommendations offered by those sites and/or platforms. The effectiveness of the recommendations in terms of predicting different user interests may increase or decrease the engagement, sales, and/or other interactions the users have with those sites and/or platforms.

DETAILED DESCRIPTION OF EXAMPLE EMBODIMENTS

Figure 1:
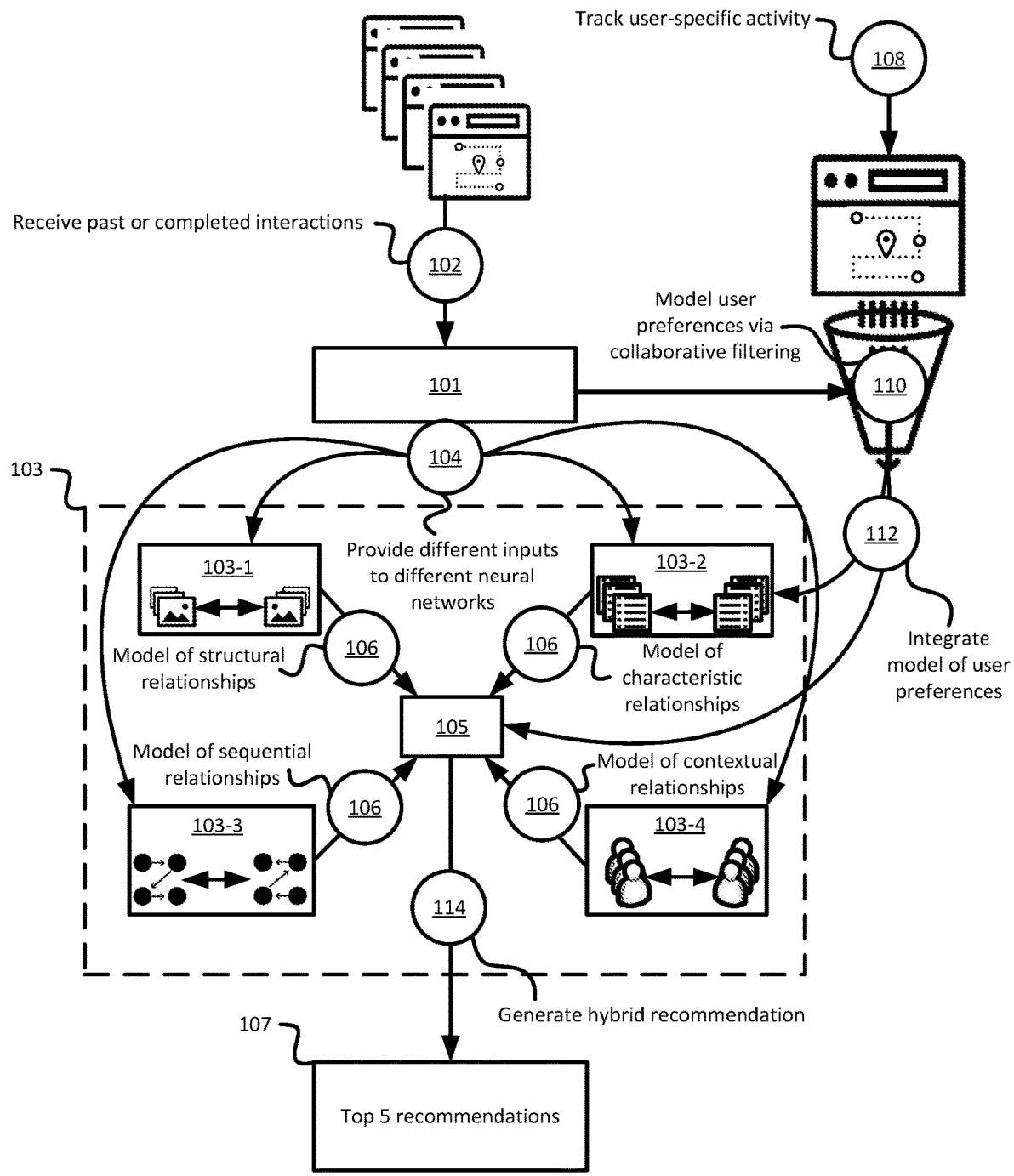
FIG. 1 illustrates an example of generating a hybrid recommendation by using individual user preferences to influence models that are generated from different sets of collective user and item information in accordance with some embodiments presented herein.

The following detailed description refers to the accompanying drawings. The same reference numbers in different drawings may identify the same or similar elements.

Embodiments described herein provide for a hybrid recommendation system and associated methods for generating recommendations, predictions, and/or classifications. The hybrid recommendation system may generate recommendations, predictions, and/or classifications for different users by applying collaborative filtering to influence the models that are output from different neural networks and/or artificial intelligence that is trained based on different data relationships. Specifically, the hybrid recommendation system may use Convolutional Neural Networks ("CNNs"), Recurrent Neural Networks ("RNNs"), Multi-Layer Perceptron ("MLP") Deep Neural Networks ("DNNs"), and/or other DNNs to model characteristic information, structural/visual information, sequential information, interactive information, contextual information, and/or types of information that are derived from interactions and/or activity of a collective set of users with items, and may use collaborative filtering (e.g., Alternate Least Squares ("ALS")-based collaborative filtering) outputs from a separate neural network (e.g., Neural Collaborative Filter ("NCF")) to influence the models from the other neural networks with interactions and/or activity of a specific user. Consequently, the hybrid recommender system may address gaps and improve the accuracy of a stand-alone collaborative filtering system by producing recommendations, predictions, and/or classifications that combine collaborative filtering and deep learning models.

In some embodiments, the hybrid recommendation system may influence the neural network models by providing the collaborative filtering outputs as one or more inputs of the neural networks, or by combining the collaborative filtering outputs with one or more outputs of the neural networks. For instance, the hybrid recommendation system may use ALS-based collaborative filtering outputs to train a DNN model compiled and/or tracked from user activity. The output from the trained model may be provided as input to one or more other neural networks in order to incorporate the individual user preferences in the resulting recommendations and/or to integrate the individual user preferences as added dimensions that influence the modeling output from the one or more other neural networks. In some embodiments, the hybrid recommendation system may bias the neural network models by integrating and/or combining the collaborative filtering outputs with the models and/or outputs of the neural networks.

Each neural network of the hybrid recommendation system may use different forms of artificial intelligence and/or deep machine learning techniques to selectively capture, derive, and/or model linear, non-linear, trivial, and/or non-trivial relationships from different sets or types of structured data, unstructured data, labeled data, and/or unlabeled data, and to extract more complex abstractions from the modeled relationships and/or through representations of the modeled data. The modeled relationships may include user-to-item relationships, item-to-item relationships, and/or other relationships based on structural (e.g., visual) information, sequential information, interactive information, characteristic information, contextual information, and/or types of information with which the items are represented and/or with which the user may interact. In some embodiments, the different neural networks may generate matrices with numerical values that represent the modeled relationships and/or the probability of the relationship contributing to a particular outcome, recommendation, classification, and/or prediction (e.g., selecting a particular item for further information, adding the particular item to an online shopping cart, purchasing the particular item, etc.).

The hybrid recommendation system may support both regression-based and classification-based recommendations, predictions, and/or different types of classifications. To support regression-based recommendations and/or predictions, the hybrid recommendation system may score each modeled relationship as a normalized value, and/or may generate models that output a recommendation and/or prediction with a score. To support classification-based recommendations and/or classifications, the hybrid recommendation system may provide a binary value or a probability for each modeled relationship, and/or may generate models that output a binary recommendation, multi-class recommendation and/or classification.

The hybrid recommendation system may generate recommendations, predictions, and/or classifications for a variety of uses, industries, and/or applications. For instance, the hybrid recommendation system may generate a first set of recommendations for products that an e-commerce site should promote to various new users and/or existing users, may generate a second set of recommendations for content that a streaming platform should suggest to different users, and/or may generate a third set of recommendations for resources that a service provider should allocate to different service regions.

FIG. 1 illustrates an example of generating a hybrid recommendation by using individual user preferences to influence models that are generated from different sets of collective user and item information in accordance with some embodiments presented herein. As shown in FIG. 1, hybrid recommendation system 101 may obtain (at 102) a collective set of user and item information from past and/or completed interactions that different users have had with one or more items, sites, applications, and/or platforms.

Hybrid recommendation system 101 may use (at 104) different characteristic information, contextual information, structural information, sequential information, interactive information, and/or other types of information from the collective set of information as inputs for different neural networks 103 (i.e., first neural network 103-1, second neural network 103-2, third neural network 103-3, and fourth neural network 103-4 in this example). The characteristic information may include features, attributes, and/or other textual descriptions of a user, item, product, service, content, and/or other offering. The contextual information may capture the time, location, area, user demographics, other user attributes, and/or other environmental variables for each of the collective set of users and/or their interactions. For instance, geolocation information from a user equipment ("UE") of a particular user may identify the location of the particular user when a particular interaction occurs. The contextual information may identify behavioral patterns and/or trends based on time, location, area, user demographics, other user attributes, and/or the other environmental variables. The structural information may correspond to images and/or other visual information, and/or may include additional data for the types and/or numbers of interactions that different users have with those images. For instance, the structural information may reveal that a first image of an item generates a higher measure of user engagement than a second image of the same item. The sequential information may track the sequence with which different users perform different interactions. The interactions may include any trackable activity such as viewing time, selection of different user interface ("UI") elements or links, and/or input provided by different users. Accordingly, the sequential information may include an ordered list of actions that different users perform, and/or may include an outcome associated with each sequence (e.g., navigated away to another site, added to cart, completed purchase, etc.). The interactive information may show the propensity of user-item interactions.

The collective set of user information may be compiled over time from one or more disparate sources. In some embodiments, hybrid recommendation system 101 may generate the collective set of user information from explicit and/or implicit interactions. Data collected from explicit interactions may include information about user preferences that different users provide intentionally, and may include explicit actions such as selecting an item to view, adding an item to a shopping cart, providing a rating and/or review, submitting a "like" or "dislike," purchasing an item, and/or performing some other explicit action. Data collected from implicit interactions may include information based on unintentional and/or subconscious user and item interactions. The implicit interactions may be derived from browsing sessions, search history, pointer positioning, purchase history, dwell time on different UI elements, and/or other captured user behavior.

Each neural network 103 may generate (at 106) one or more models based on the input information. In some embodiments, each neural network 103 may model the interactions among each of the different types of information that is input to each neural network 103, and may output scores or values based on the modeled interactions. The output may include probabilities that certain interactions with certain characteristic information, contextual information, structural information, sequential information, and/or other types of information produce certain outcomes. The outcomes may be defined based on a desired set of recommendations, predictions, and/or classifications. For instance, the output may include a probability of a user purchasing a particular item after the user views a particular image of that particular item. In some embodiments, the output may be generated for different combinations of the characteristic information, contextual information, structural information, sequential information, interactive information, and/or other types of information that is input to a neural network 103. For instance, the output may include a probability of a user purchasing a particular item after the user views a combination of item features, attributes, descriptive text, and/or one or more images for that particular item. The one or more models may provide the different scores, values, and/or probabilities for the different modeled interactions.

Hybrid recommendation system 101 may also collect (at 108) information about a particular user in order to personalize and/or customize the recommendations, predictions, and/or classifications that are produced from the neural network modeling. In particular, hybrid recommendation system 101 may bias the modeling (at 106) performed by the neural networks 103 with the collected information about the particular user, and/or may adjust the resulting models with the collected information about the particular user in order to personalize and/or customize the recommendations, predictions, and/or classifications.

Hybrid recommendation system 101 may collect (at 108) the individual user information by tracking activity (e.g., user interactions with different items) from a current browsing session of the particular user, a profile that is created from past interactions (e.g., purchases, browsing sessions, behaviors, and/or other tracked activity) by the particular user, and/or subscriber information that identifies various characteristic information of the particular user.

Hybrid recommendation system 101 may determine (at 110) preferences of the particular user via a separate modeling of the collective set of user information (e.g., the collective set of user interactions with different items) with the collected individual user information. For instance, the collective individual user information may identify the particular user's interests, the integrated modeling may identify other users with similar interests as the particular user, and, from the integrated modeling, hybrid recommendation system 101 may determine (at 110) the preferences of the particular user based on the preferences that are identified for the users with similar interests. In some embodiments, hybrid recommendation system 101 may determine (at 110) the preferences of the particular user by performing a collaborative filtering of the user-item interactions from the collective set of user information using individual preferences extracted from the collected individual user information.

In some embodiments, hybrid recommendation system 101 may provide (at 112) the modeling for the particular user's preferences as additional input to one or more of neural networks 103. For instance, hybrid recommendation system 101 may format the output of the collaborative filtering so that the output may be directly fed as input into one or more of neural networks 103.

In some other embodiments, hybrid recommendations may combine (at 112) the modeling for the particular user's preferences with the models that are generated from each neural network 103 at shared layer 105. For instance, hybrid recommendation system 101 may refine the output of the collaborative filtering through one or more of neural networks 103 so that the output may be concatenated or mathematically combined (e.g., using a matrix dot product) to produce recommendations, predictions, and/or classifications.

In any case, one or more personalized recommendations, predictions, and/or classifications 107 may be generated (at 114) for the particular user at shared layer 105 based on the biased models' outputs to shared layer 105 when providing (at 112) the modeling for the particular user's preferences as additional input to one or more of neural networks 103, or from combining the models from neural networks 103 with the modeling for the particular user's preferences at shared layer 105. In some embodiments, personalized recommendations, predictions, and/or classifications 107 may include an ordered list of products, services, content, and/or data that may be determined to be of most interest to the particular user in response to influencing the modeling of the collective set of user information with the specific information that is collected (at 108) for the particular user. In some embodiments, personalized recommendations, predictions, and/or classifications 107 may include predictions for different future activity of the particular user or actions that a third-party should take to accommodate the particular user.

Figure 2:
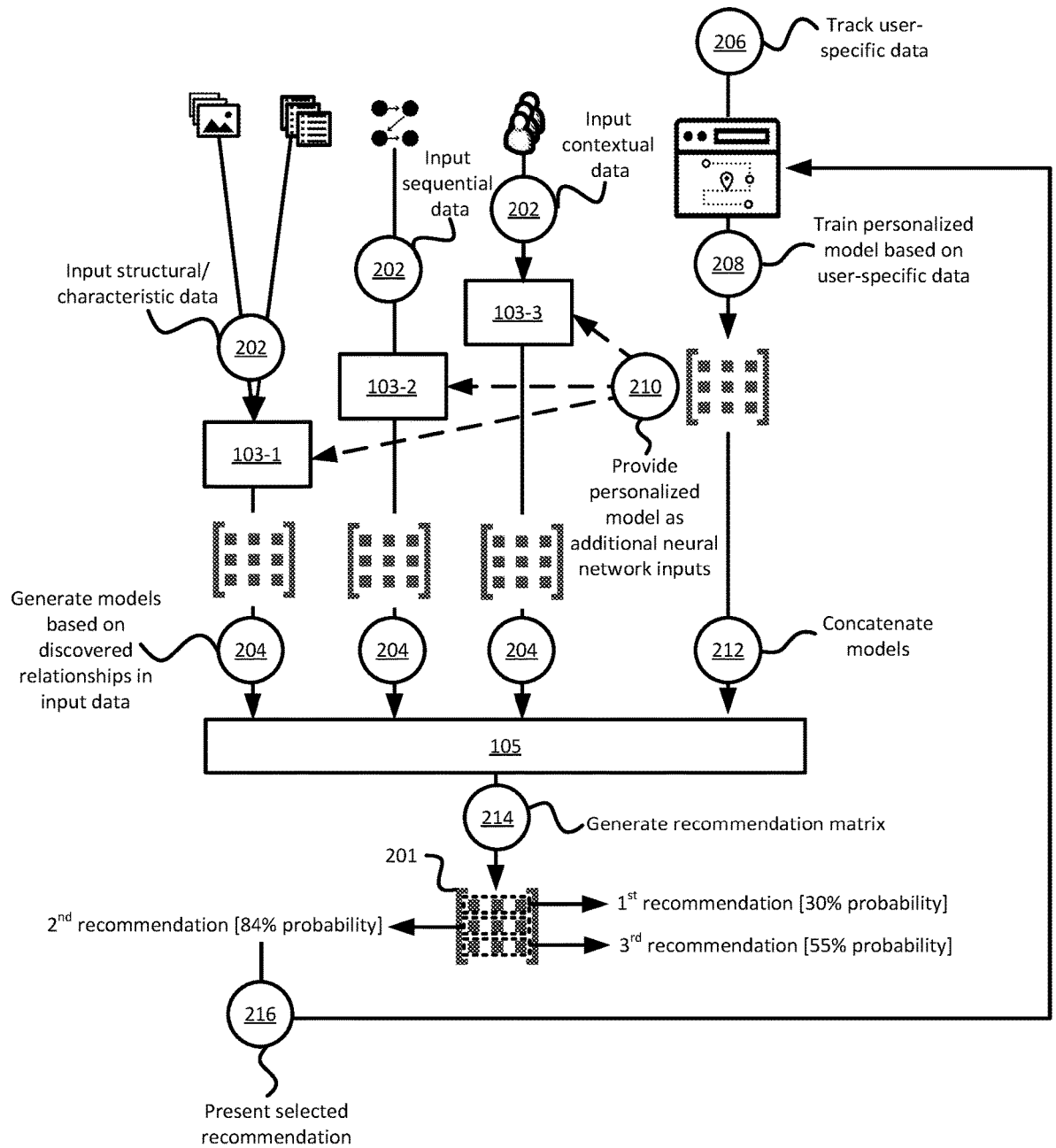
FIG. 2 illustrates an example for generating hybrid recommendations, predictions, and classifications based on collaborative filtering output that is incorporated into a set of neural network models in accordance with some embodiments presented herein.

FIG. 2 illustrates an example for generating hybrid recommendations, predictions, and/or classifications based on collaborative filtering output that is incorporated into a set of neural network models in accordance with some embodiments presented herein. As shown in FIG. 2, each neural network 103 may receive (at 202) a different set of the collective set of user/item information as input. In some embodiments, a neural network may receive (at 202) two or more sets of the collective set of user-specific information as input. For instance, FIG. 2 illustrates first neural network 103-1 receiving (at 202) the structural information and the characteristic information as inputs, second neural network 103-2 receiving (at 202) the sequential information as input, and third neural network 103-3 receiving (at 202) the user and item characteristics and contextual information as input. Accordingly, hybrid recommendation system 101 may be implemented with more or less neural networks 103 than those depicted in FIG. 2.

Each neural network 103 may generate (at 204) different models based on the received input information. The models generated (at 204) by each neural network 103 may have a common format and/or may include normalized values (e.g., values that range from 0.0 to 1.0). In some embodiments, the models may be represented as one or more matrices or tensors. The matrices or tensors may provide probabilities that user interactions with different input information are associated with or lead to a desired outcome (e.g., purchasing of a particular item).

For instance, hybrid recommendation system 101 may supply first neural network 103-1 with input data that includes interactions that users have with different structural and characteristic information. First neural network 103-1 may generate (at 204) a single or multi-dimensional matrix. A particular row and column of the matrix may include a value that represents the probability that a particular user or type of user interacting with specific structure or characteristic information will result in the desired outcome. A probability value of 1.0 or 0.99 may indicate a direct correlation between user interactions with the specific structure or characteristic information and the desired outcome, whereas a value of 0.0 or 0.1 may indicate a low or insignificant correlation between user interactions with the specific structure or characteristic information and the desired outcome. For example, when the probability value in the matrix is associated with a particular image, then the probability value of 1.0 may indicate that every user purchase of a particular item involved the user selecting or viewing that particular image.

In some embodiments, the sum of the probability values from a row or vector of the matrix may represent the probability that interactions with a particular combination of input information results in the desired outcome. In some such embodiments, each row of the matrix may represent different combinations of the input information and/or the probability of each combination producing the same outcome. In some other embodiments, each row of the matrix may represent the probability that interactions with the same combination of input information results in different outcomes (e.g., purchasing a first item, purchasing a second item, etc.).

Recommendations, predictions, and/or classifications may be derived from the values of the matrices and/or the values within vectors extracted from the matrices. Without biasing the generated (at 204) models with preferences or tracked activity of a particular user, the resulting recommendations, predictions, and/or classifications are not customized for the particular user.

Accordingly, hybrid recommendation system 101 may improve the accuracy of the recommendations, predictions, and/or classifications for the particular user by tracking (at 206) interactions and/or user-specific information generated by the particular user, and by influencing and/or adjusting the recommendations, predictions, and/or classifications from neural networks 103 using the user-specific information. In some embodiments, hybrid recommendation system 101 may use ALS-based collaborative filtering to train (at 208) a personalized model based on user-item interactions from the collective set of user information and the user-specific information. In some embodiments, hybrid recommendation system 101 may combine collaborative filtering with content-based modeling. The content-based modeling may use additional information about users and/or items that may be gleaned from the modeling of the one or more neural networks 103, in order to better classify some of the user-specific interactions and/or information.

The collaborative filtering may produce (at 208) one or more models and/or matrices that recommend and/or predict future interactions of the particular user based on the particular user's past interactions (e.g., the tracked user-specific information) and past interactions of other users with similar interests, preferences, behaviors, or attributes as the particular user. In some embodiments, the models and/or matrices that are output (at 208) from the collaborative filtering may have the same format as the models output from neural networks 103. For instance, the collaborative filtering may output one or more matrices with normalized values that are in range of the normalized values within the neural network matrices.

The matching formatting may allow for the direct integration of the collaborative filtering output into neural networks 103 or the output resulting from neural networks 103. In some embodiments, hybrid recommendation system 101 may directly integrate the collaborative filtering output into neural networks 103 by providing (at 210) the collaborative filtering output as additional inputs to one or more of neural networks 103. In some such embodiments, neural networks 103 may incorporate the factorized and/or normalized user-specific information (e.g., the user-item interactions) with the respective set of characteristic, contextual, structural, sequential, and/or other types of information that is input to those neural networks 103, thereby influencing and/or biasing the resulting models. Hybrid recommendation system 101 may combine the biased models from each neural network 103 at shared layer 105 via a concatenation, dot product, or other mathematical joining of the models, and may generate (at 214) recommendation matrix 201 based on the combined models. In some embodiments, hybrid recommendation system 101 may directly integrate the collaborative filtering output with the output from neural networks 103 by combining the collaborative filtering models with one or more models produced by neural networks 103. In some such embodiments, hybrid recommendation system 101 may combine the models by concatenating (at 212) or taking the dot product of the various models and/or matrices from the collaborative filtering and neural networks 103 at shared layer 105, and by generating (at 214) recommendation matrix 201 based on the concatenated result.

Hybrid recommendation system 101 may produce recommendations, predictions, and/or classifications which are based on the modeled characteristic, contextual, structural, sequential, interactive, and user-specific relationships, from different vectors of recommendation matrix 201. Hybrid recommendation system 101 may score each recommendation and/or prediction using the probability values included with each vector, and may select the recommendation and/or prediction to present to the particular user based on the scoring. For instance, hybrid recommendation system 101 may dynamically update (at 216) the UI or site that is presented to the particular user in order to recommend one or more items that are determined from the modeling to be of most interest to the particular user.

Figure 3:
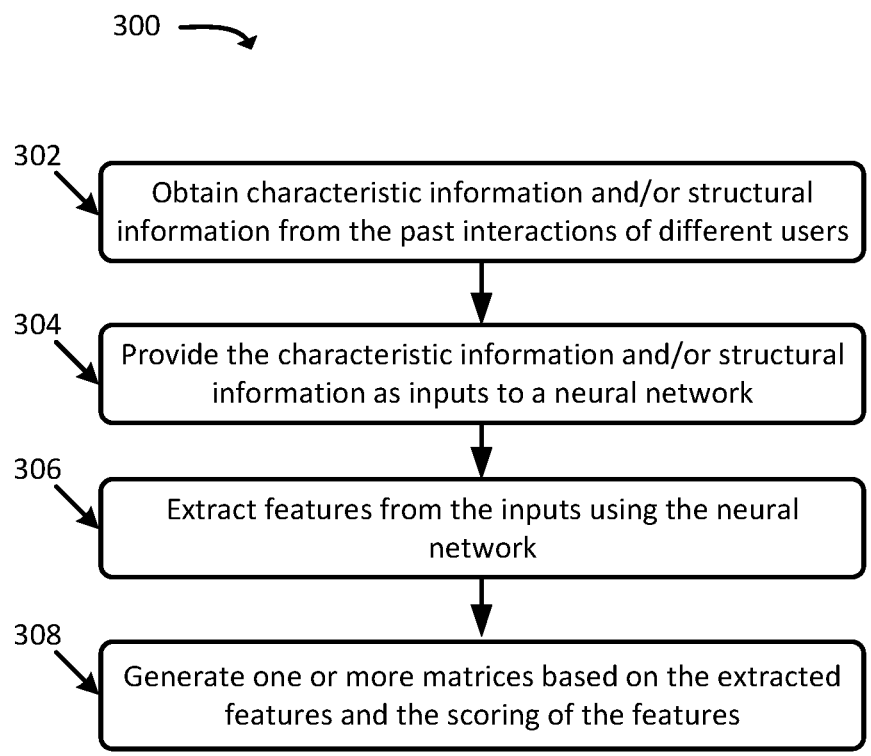
FIG. 3 presents a process for modeling the characteristic and/or structural components that influence the generation of the hybrid recommendations, predictions, and/or classifications in accordance with some embodiments presented herein.

FIG. 3 presents a process 300 for modeling the characteristic and/or structural components that influence the generation of the hybrid recommendations, predictions, and/or classifications in accordance with some embodiments presented herein. Process 300 may be implemented within a first neural network of hybrid recommendation system 101.

Process 300 may include obtaining (at 302) characteristic information and/or structural information from the past interactions that different users have had with the one or more websites, applications, and/or platforms under control of a particular entity (e.g., e-commerce merchant, streaming provider, etc.). Obtaining (at 302) the characteristic information and/or structural information may include identifying visual content (e.g., images, graphics, videos, multimedia, etc.) and/or textual content (e.g., descriptions) appearing throughout the websites, applications, and/or platforms, and/or extracting the past interactions (e.g., selections, time spent viewing, time spent hovering over, etc.) that different users have had with that visual and/or textual content.

In some embodiments, the characteristic information and/or structural information may be preprocessed. For instance, textual descriptions from a website may be preprocessed using Word2Vec, USE, and/or other textual mappings to generate embeddings or pretrained models that may be directly input into one or more neural networks. Images may be digitized into a binary format that may be directly input into the neural networks and/or manipulated when incorporated within a matrix.

Process 300 may include providing (at 304) the characteristic information and/or structural information as inputs to a first neural network. In some embodiments, the first neural network may be a CNN. In some embodiments, providing (at 304) the characteristic information and/or structural information may include providing the digitized conversation of the image and/or the embeddings that are generated for the textual descriptions by Word2Vec, USE, and/or other textual mappings.

Process 300 may include extracting (at 306) features from the inputs using the CNN. In some embodiments, the CNN may include one or more of a convolution layer, a batch normalization layer, a max pooling layer, a flattening layer, one or more dense and dropout layers, and/or other layers for extracting (at 306) the features from the input characteristic information, structural information, and/or visual information.

The features may correspond to different discovered interactions and/or relationships between the characteristic information and/or structural information. More specifically, the features may come from different interactions that different users have with different items, products, services, content, and/or data based on the presence or absence of the images, textual descriptions, and other characteristic information or other structural information. In some embodiments, each extracted feature may be scored to provide weights or scores to images, textual descriptions, and/or other characteristic information or structural information based on the number of times the discovered interactions and/or relationships were part of interactions that produced a particular outcome. The particular outcome may include the purchase of a particular item, the inclusion of the particular item in an online shopping cart, the selection of the particular item for additional information, and/or other dispositions for desired recommendations and/or predictions.

Process 300 may include generating (at 308) one or more matrices based on the extracted features and the scoring of the features. Each column within the set of matrices may provide a score for the probability that an interaction with a particular image, textual description, and/or other characteristic information or structural information is associated with or influences one or more outcomes. Each row from the set of matrices may correspond to a vector that encompasses a different combination of image interactions and/or textual description interactions. Moreover, in some embodiments, the overall score from each vector may represent a probability or likelihood of the vector combination producing a particular outcome for a different user, different type of user, or different item (e.g., a product, service, content, and/or other offering). In some other embodiments, the overall score from each vector may represent a probability or likelihood of the vector combination producing different outcomes for the same user, same type of user, or same item. Accordingly, each matrix from the set of matrices may score the impact that different characteristic and/or structural combinations have for different users, types of users, or items (e.g., products, services, content, or other offerings that may be recommended to users).

Figure 4:
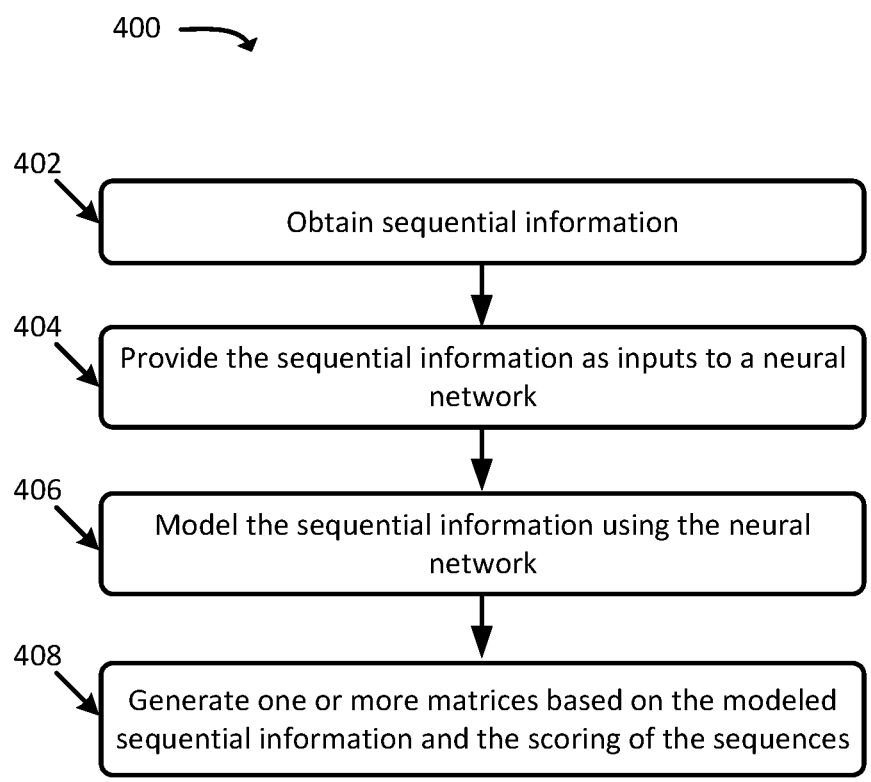
FIG. 4 presents a process for modeling the sequential components that influence the generation of the hybrid recommendations, predictions, and/or classifications in accordance with some embodiments presented herein.

FIG. 4 presents a process 400 for modeling the sequential components that influence the generation of the hybrid recommendations, predictions, and/or classifications in accordance with some embodiments presented herein. Process 400 may be implemented within a second neural network of hybrid recommendation system 101.

Process 400 may include obtaining (at 402) sequential information from the past interactions that different users have had with the one or more websites, applications, and/or platforms under control of the particular entity (e.g., e-commerce merchant, streaming provider, etc.). The sequential information may include denormalized inputs that list user interactions according to time or other sequencing. For instance, the sequential information may identify different sequences of user interactions with a website (e.g., selected UI elements, invoked actions, and/or other input).

Process 400 may include providing (at 404) the sequential information as inputs to a second neural network, and modeling (at 406) the sequential information using the second neural network. In some embodiments, the second neural network may be a RNN. Modeling (at 406) the sequential information may include determining an outcome for each sequence or a set of sequences (e.g., a first sequence leading to a purchase of a first item, a second sequence leading to a purchase of a second item, etc.).

In some embodiments, the modeling (at 406) may be based on Sequence-to-Sequence ("S2S") or other form of machine learning that transforms the input sequences to a common set of outcome sequences or other sequences. More specifically, S2S may use Long Short Term Memory ("LSTM"), Gated Recurrent Units ("GRU"), and/or other variants of RNN to determine the most likely sequence or outcome that is to follow a particular input sequence. In some embodiments, the second neural network or the S2S may include one or more of a LSTM layer, one or more Leaky Rectified Linear Unit ("LeakyReLu") layers and/or other neural network activation functions, a max pooling layer, one or more dense and dropout layers, and/or other layers for modeling (at 406) the sequential information. In some embodiments, the modeling (at 406) may generate scores for the probability that an input sequence leads to one or more outcomes.

Process 400 may include generating (at 408) one or more matrices based on the modeled sequential information and the scoring of the sequences. Each column within the set of matrices may provide a score for the probability that an input sequence is associated with or influences one or more outcomes. Each row from the set of matrices may correspond to a vector that encompasses a different combination of sequences. In some embodiments, the overall score from each vector may represent a probability or likelihood of the vector combination producing a particular outcome for a different user, different type of user, or different item (e.g., a product, service, content, and/or other offering). In some other embodiments, the overall score from each vector may represent a probability or likelihood of the vector combination producing different outcomes for the same user, same type of user, or same item. Accordingly, each matrix from the set of matrices of the second neural network may score the impact that different combinations of input sequences have for different users, types of users, or items.

Figure 5:
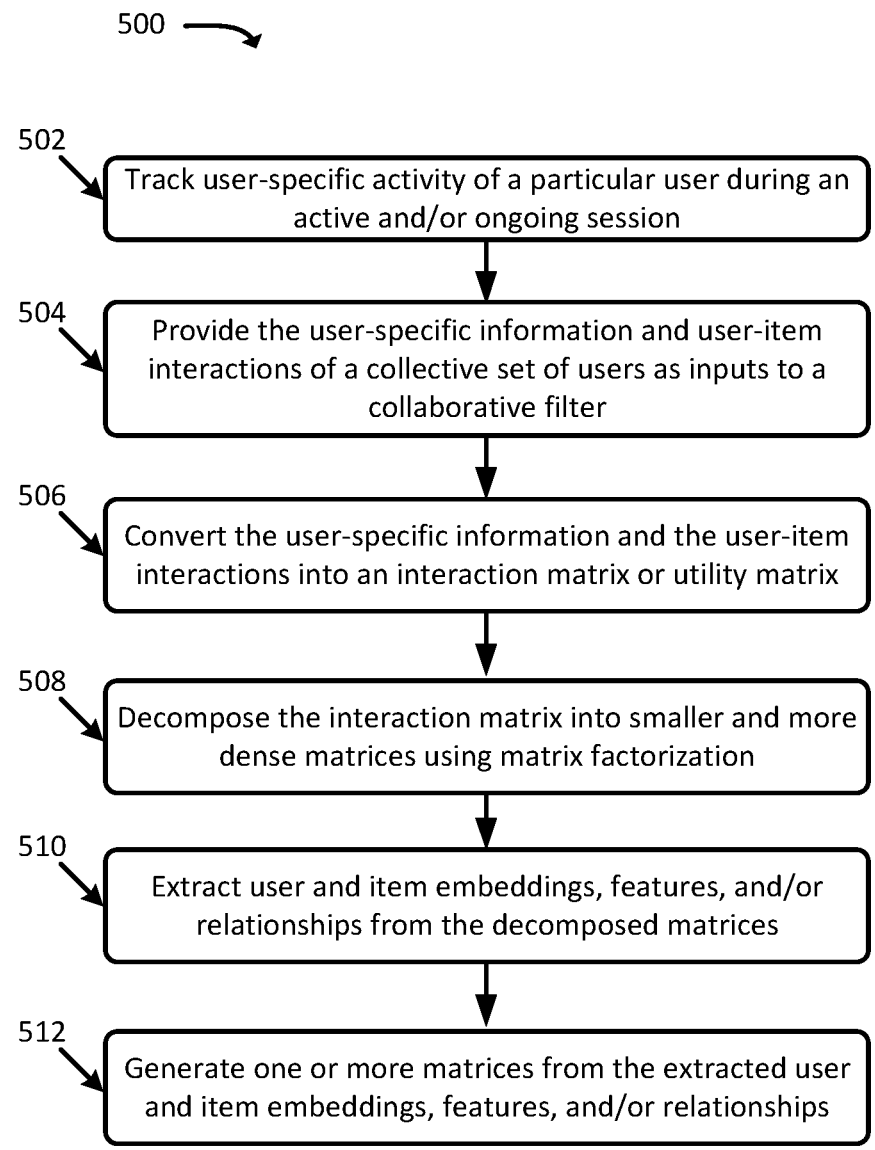
FIG. 5 presents a process for modeling interactions of a particular user and influencing the hybrid recommendations, predictions, and/or classifications based on the particular user's interactions in accordance with some embodiments presented herein.

FIG. 5 presents a process 500 for modeling interactions of a particular user and influencing the hybrid recommendations, predictions, and/or classifications based on the particular user's interactions in accordance with some embodiments presented herein. Process 500 may be implemented within a third neural network of hybrid recommendation system 101.

Process 500 may include tracking (at 502) user-specific activity of a particular user during an active and/or ongoing session. For instance, the particular user may access a website and/or may begin browsing for different items, content, and/or offerings. Tracking (at 502) the user-specific activity may include tracking interactions the particular user has with the website and various UI element therein (e.g., tracking characteristic, contextual, structural, sequential, and/or other types of information being generated from the particular user's interactions), and may further include extracting past activity of the particular user from one or more source using identifying information about the particular user. For instance, hybrid recommendation system 101 may use an Internet Protocol ("IP") address, login credentials, and/or other identifiers associated with the particular user to lookup a user profile that includes the past tracked activity of the particular user (e.g., past purchases, past likes, reviews or ratings submitted by the particular user, etc.).

Process 500 may include providing (at 504) the user-specific information (e.g., the tracked activity for the particular user) and the past activity (e.g., user-item interactions) of the collective set of users as inputs to a third neural network. In some embodiments, the third neural network may include an NCF. The NCF may use collaborative filtering to generate one or more models of future interactions and/or activity by the particular user based on the user-specific information and the past activity of the collective set of users. In particular, the models may specify different probabilities with which the current tracked activity by the particular user is likely to yield a particular outcome based on the past tracked activity and/or preferences of the particular user aligning with the past tracked activity and/or preferences of a set of similar users, and the set of similar users producing the particular outcome and/or other outcomes.

Process 500 may include converting (at 506) the user-specific information and the past activity of the collective set of users into an interaction matrix or utility matrix. The conversion (at 506) may provide a formatting for the user-specific information that may be mathematically manipulated to derive the models.

Process 500 may include decomposing (at 508) the interaction matrix into smaller and more dense matrices using matrix factorization. In some embodiments, the NCF may use ALS as the matrix factorization technique for decomposing the interaction matrix into a user-factor matrix and an item-factor matrix, wherein a dot product of the user-factor matrix with the transpose of the item-factor matrix may produce the interaction matrix.

Process 500 may include extracting (at 510) different user and item embeddings, features, and/or relationships that are personalized for the particular user from the decomposed matrices. In some embodiments, the user and item embeddings, features, and/or relationships may be combined to identify personalized recommendations, predictions, and/or classifications for the particular user. In some embodiments, extracting (at 510) the embeddings, features, and/or relationships may include concatenating or taking the dot product of the ALS-generated embeddings, features, and/or relationships, and passing the flattened results through one or more pairs of dense and dropout layers to discover additional nonlinear relationship combinations between the past tracked user activity and future user activity.

Process 500 may include generating (at 512) one or more matrices from the extracted user and item embeddings, features, and/or relationships. Generating (at 512) the set of matrices may include scoring or determining a probability with which each discovered embedding, feature, and/or relationship may result in a particular outcome. Each row from the set of matrices may correspond to a vector that encompasses a different combination of tracked user activity. In some embodiments, the overall score from each vector may represent a probability or likelihood that the particular user will perform a particular action or reach a particular outcome based on past actions represented by the vector combination.

Figure 6:
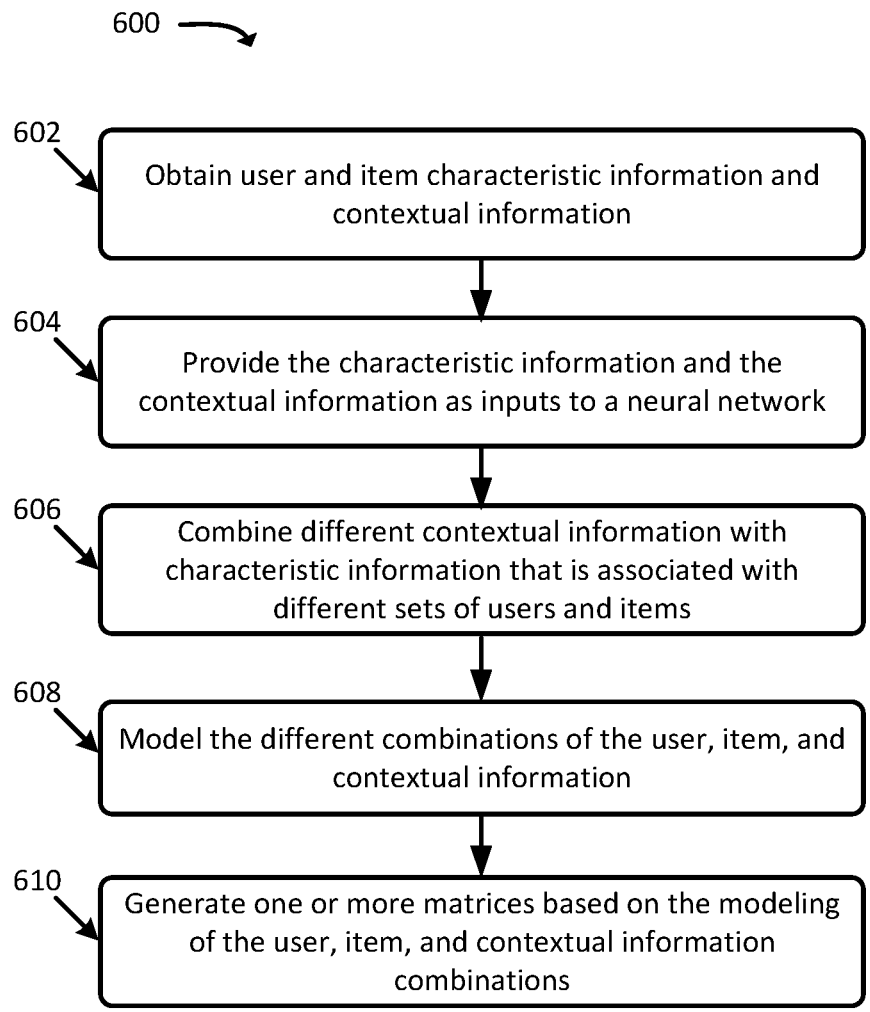
FIG. 6 presents a process for modeling the user, item, and contextual components that influence the generation of the hybrid recommendations, predictions, and/or classifications in accordance with some embodiments presented herein.

FIG. 6 presents a process 600 for modeling the user, item, and contextual components that influence the generation of the hybrid recommendations, predictions, and/or classifications in accordance with some embodiments presented herein. Process 600 may be implemented within a fourth neural network of hybrid recommendation system 101.

Process 600 may include obtaining (at 602) available user and item characteristic information and/or contextual information for the past users and/or the particular user that is to receive the hybrid recommendations and/or predictions. The user and item characteristic information may include the user and item profile characteristics and those based on past interactions (e.g., selections, time spent viewing, time spent hovering over, etc.) that different users have had with different items and/or textual content, and/or the outcomes from the past interactions (e.g., completed sale, item added to shopping cart, different item selected, navigated to a competitor site, etc.). The contextual information may include the time, location, area, user demographics, other user attributes, and/or other environmental variables associated with each user accessing the websites, applications, and/or platforms under control of the particular entity. In some embodiments, hybrid recommendation system 101 may obtain (at 602) the contextual information based on the IP address, geolocation information, subscriber information, and/or other information that may be obtained for each user or UE of that user.

Process 600 may include providing (at 604) the user and item characteristic information and/or the contextual information as inputs to the fourth neural network of hybrid recommendation system 101. The fourth neural network may include a self-contained Feature Processor ("FP"). The FP may model the various linear and non-linear relationships amongst the characteristic and/or contextual features input to the fourth neural network. Accordingly, process 600 may include combining (at 606) different contextual information with characteristic information that is associated with different sets of users and items.

Process 600 may include modeling (at 608) the different combinations of the user, item, and contextual information. Modeling (at 608) the different combinations of the user, item, and contextual information may include determining the probability that the different contextual information combinations resulted in different outcomes. For instance, the modeling (at 608) may identify that a first set of users in a first region and with an age range between 30-55 have a 65% probability of purchasing a first item, whereas a second set of users in a second region and with an age range between 16-29 have a 80% probability of purchasing a second item.

Process 600 may include generating (at 610) one or more matrices based on the modeling of the user, item, and contextual information combinations. In some embodiments, each entry within the set of matrices may include a probability for particular contextual information producing an outcome, and each row from the set of matrices may correspond to a vector that encompasses a different combination of user, item, and contextual information. In some embodiments, the overall score from each vector may represent a probability or likelihood that a user with a particular combination of contextual information represented by that vector will produce a particular outcome or perform a particular action.

Figure 7:
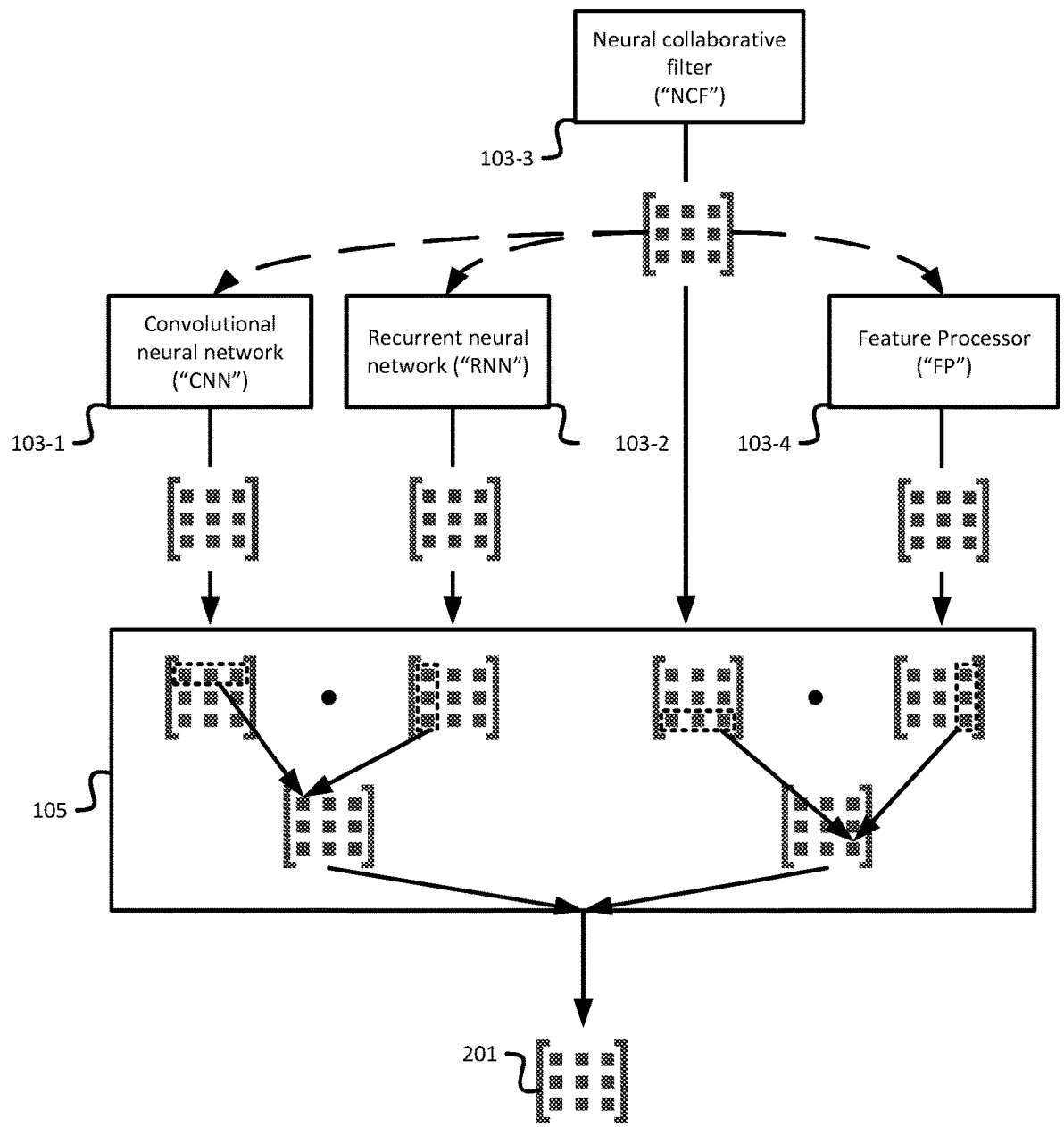
FIG. 7 illustrates an example of generating a hybrid recommendation by combining the neural network modeling of different collective user-specific interactions by a particular user in accordance with some embodiments presented herein.

FIG. 7 illustrates an example of generating a hybrid recommendation by combining the neural network modeling of different collective user-specific interactions by a particular user in accordance with some embodiments presented herein. As shown in FIG. 7, hybrid recommendation system 101 may aggregate the output from two or more neural networks 103 at shared layer 105.

In some embodiments, the outputs aggregated at shared layer 105 may include two or more of the first set of matrices output from the CNN via process 300, the second set of matrices output from the RNN via process 400, the third set of matrices output from the NCF via process 500, and/or the fourth set of matrices output from the FP via process 600. In some other embodiments, the collaborative filtering output from the NCF (e.g., third neural network 103-3) may be directly integrated into the models that are output from one or more of first neural network 103-1, second neural network 103-2, and/or fourth neural network 103-4 by providing the collaborative filtering output as additional input to the other neural networks. In some such embodiments, the models that are output from each of first neural network 103-1, second neural network 103-2, and/or fourth neural network 103-4 may be adjusted, biased, or otherwise influenced by the user and item embeddings, features, and/or relationships discovered for the particular user via the collaborative filtering of the user-specific information.

At shared layer 105, hybrid recommendation system 101 may combine the aggregated models from different neural networks 103. Combining the aggregated models may include concatenating, taking the dot product, and/or otherwise mathematically joining the normalized values from the different sets of matrices of each neural network 103 in order to produce recommendation matrix 201.

In some embodiments, third neural network 103-3 may not produce output or the output from third neural network 103-3 may not be combined with the output from the other neural networks when there is no tracked information for the particular user. For instance, the particular user may be a new user or customer that hybrid recommendation system 101 has no prior history or information about, and the new user may produce little or insufficient trackable activity when interacting with a website, application, or platform where the recommendations, predictions, and/or classifications are provided. In some such embodiments, the combining of the output may proceed without output from third neural network 103-3.

Hybrid recommendation system 101 may generate one or more recommendations, predictions, and/or classifications from recommendation matrix 201. Generating the one or more recommendations, predictions and/or classifications may include generating vectors from the different rows of the recommendation matrix, selecting vectors with the highest overall scores, and providing the recommendation, predictions, classifications and/or outcome associated with the selected vectors as output.

Each vector may include weighted values that score different interactions that past users and/or the particular user have with the different UI elements and information presented from the website, application, or platform accessed by the particular user. The values are weighted based on the probability or likelihood of an interaction leading to a particular outcome. Hybrid recommendation system 101 may sum, average, or otherwise calculate an overall score for each vector. The particular outcome associated with each vector may specify the item, content, and/or other offering to recommend to the particular user.

Figure 8:
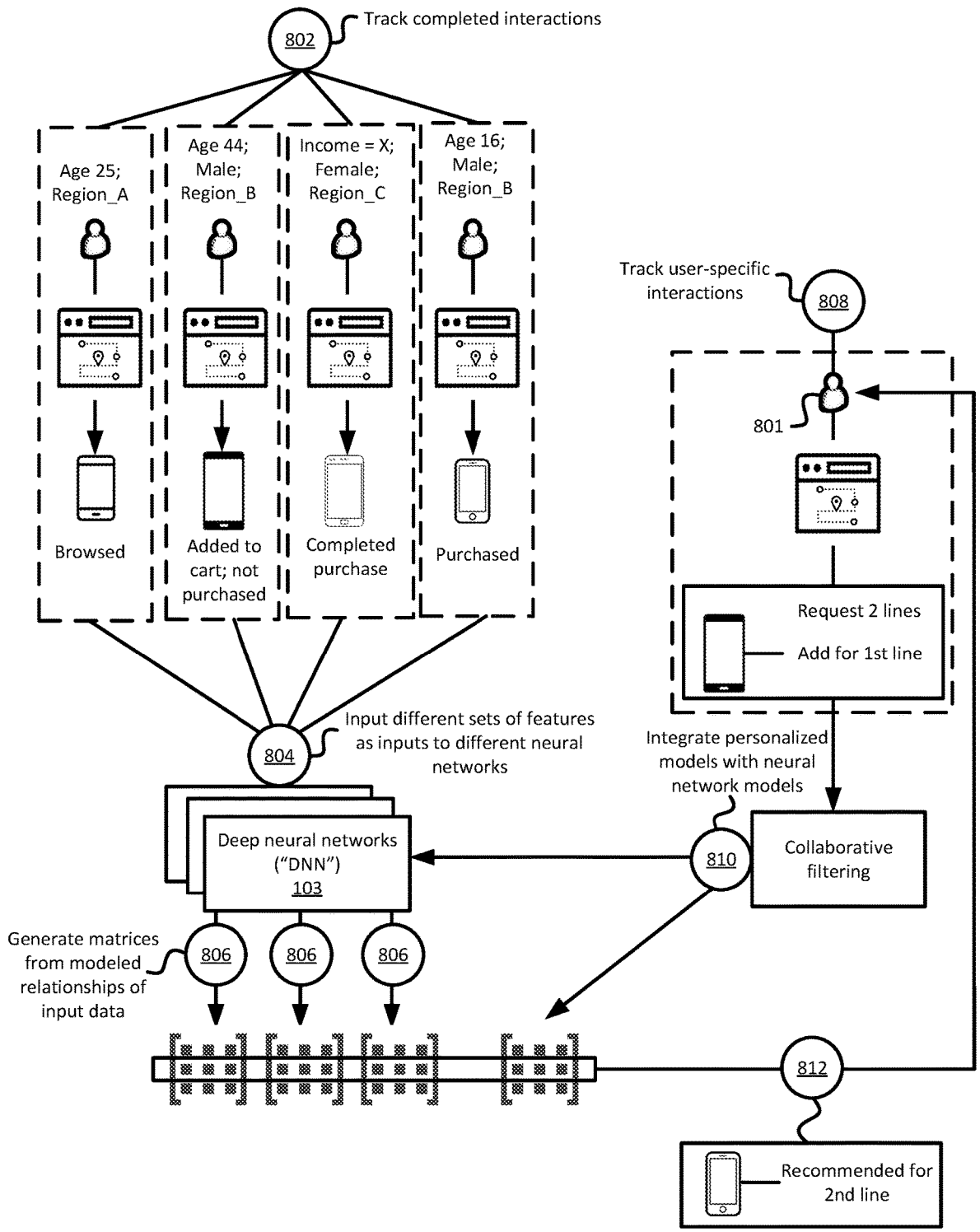
FIG. 8 illustrates generating an example set of recommendations in accordance with some embodiments presented herein.

FIG. 8 illustrates generating an example set of recommendations in accordance with some embodiments presented herein. Hybrid recommendation system 101 may track (at 802) completed interactions of a collective set of users with one or more sites operated by a telecommunications service provider, and may input (at 804) the tracked interactions into one or more neural networks 103. Each neural network 103 may generate (at 806) a different model that identifies the relationships between the outcomes of the completed interactions and a different set of characteristic, contextual, structural, sequential, and/or other information involved in the completed interactions.

Hybrid recommendation system 101 may detect new user 801 accessing the one or more sites, and may track (at 808) interactions new user 801 has with the one or more sites. For instance, the tracking (at 808) may include identifying different UEs and/or devices new user 801 views for different amounts of time and/or selects for more information. Hybrid recommendation system 101 may further track (at 808) that new user 801 has requested activation of two lines of service, and that new user 801 has selected a first smartphone for a first line of service. Additionally, hybrid recommendation system 101 may retrieve previous purchases, interactions, and/or other past activity of new user 801.

Hybrid recommendation system 101 may use collaborative filtering to train a personalized model based on the specific interactions of new user 801 and/or past activity that is specific to new user 801. Hybrid recommendation system 101 may integrate (at 810) the personalized model into the models that are generated by neural networks 103 by providing the personalized model outputs as inputs into neural networks 103, or by combining the personalized model with the models that are output from neural networks 103.

Hybrid recommendation system 101 may generate (at 812) hybrid recommendations for new user 801 in response to integrating (at 810) the personalized model into the modeling of neural networks 103. The hybrid recommendations may account for the relationships discovered through the completed transactions of the collective set of users, the relationships discovered specifically for new user 801, and/or the intersection of the different relationships.

As shown in FIG. 8, the hybrid recommendation may include a suggestion to add a second smartphone, that is different than the already selected first smartphone, for the second line of service based on the discovered relationships in the tracked activity of new user 801 and the tracked activity of the collective set of users. Hybrid recommendation system 101 may present the hybrid recommendation in UI being accessed by new user 801.

In some embodiments, hybrid recommendation system 101 may be used to recommend relevant advertisements, content, services, and/or goods to different users. In other words, the recommendations, predictions, and/or classifications generated by hybrid recommendation system 101 may be directed to customers or users that interact with a provider of goods and/or services. In some embodiments, the recommendations, predictions, and/or classifications generated by hybrid recommendation system 101 may be used provided directly to the provider of the goods and/or services. In some such embodiments, the recommendations, predictions, and/or classifications may be directed to outcomes for improving quality-of-service, optimizing resources, optimizing workflows, and/or other actions that pertain directly to the provider. For instance, hybrid recommendation system 101 may predict resource allocation and/or service usage for a telecommunications network. Specifically, hybrid recommendation system 101 may model bandwidth and/or resource utilization at different Radio Access Networks ("RANs") of the telecommunications network, and may influence the models based on individual UEs connecting to the RANs. Hybrid recommendation system 101 may generate recommendations for an optimal allocation of network resources, and/or may predict where resource utilization will be greatest at different times.

Figure 9:
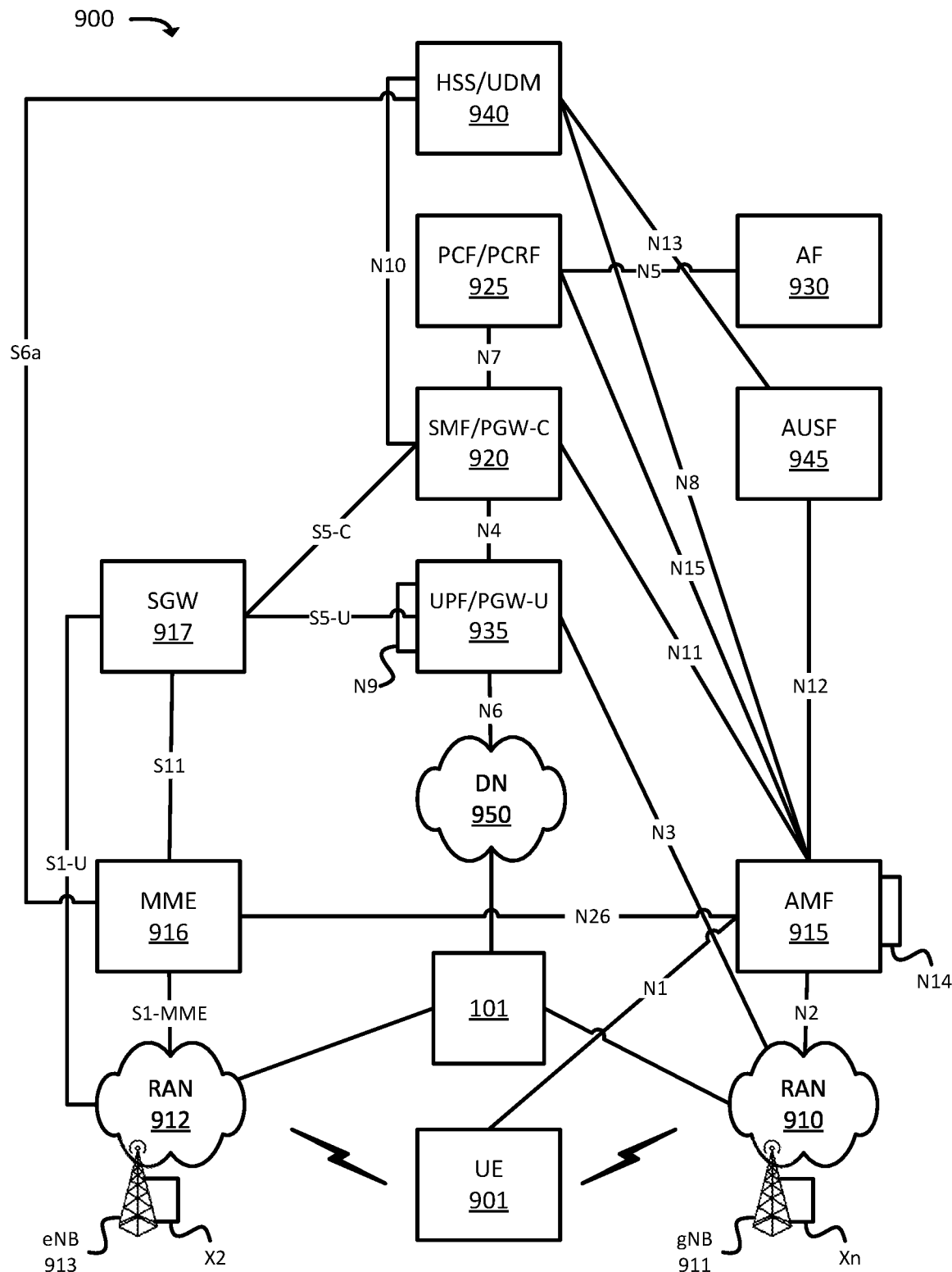
FIG. 9 illustrates an example environment, in which one or more embodiments may be implemented.

FIG. 9 illustrates an example environment 900, in which one or more embodiments may be implemented. In some embodiments, environment 900 may correspond to a Fifth Generation ("5G") network, and/or may include elements of a 5G network. In some embodiments, environment 900 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 900 may include UE 901, RAN 910 (which may include one or more Next Generation Node Bs ("gNBs") 911), RAN 912 (which may include one or more one or more evolved Node Bs ("eNBs") 913), and various network functions such as Access and Mobility Management Function ("AMF") 915, Mobility Management Entity ("MIME") 916, Serving Gateway ("SGW") 917, Session Management Function ("SMF")/Packet Data Network ("PDN") Gateway ("PGW")-Control plane function ("PGW-C") 920, Policy Control Function ("PCF")/Policy Charging and Rules Function ("PCRF") 925, Application Function ("AF") 930, User Plane Function ("UPF")/PGW-User plane function ("PGW-U") 935, Home Subscriber Server ("HSS")/Unified Data Management ("UDM") 940, and Authentication Server Function ("AUSF") 945. Environment 900 may also include one or more networks, such as Data Network ("DN") 950. Environment 900 may include one or more additional devices or systems communicatively coupled to one or more networks (e.g., DN 950), such as hybrid recommendation system 101.

The example shown in FIG. 9 illustrates one instance of each network component or function (e.g., one instance of SMF/PGW-C 920, PCF/PCRF 925, UPF/PGW-U 935, HSS/UDM 940, and/or 945). In practice, environment 900 may include multiple instances of such components or functions. For example, in some embodiments, environment 900 may include multiple "slices" of a core network, where each slice includes a discrete set of network functions (e.g., one slice may include a first instance of SMF/PGW-C 920, PCF/PCRF 925, UPF/PGW-U 935, HSS/UDM 940, and/or 945, while another slice may include a second instance of SMF/PGW-C 920, PCF/PCRF 925, UPF/PGW-U 935, HSS/UDM 940, and/or 945). The different slices may provide differentiated levels of service, such as service in accordance with different Quality of Service ("QoS") parameters.

The quantity of devices and/or networks, illustrated in FIG. 9, is provided for explanatory purposes only. In practice, environment 900 may include additional devices and/or networks, fewer devices and/or networks, different devices and/or networks, or differently arranged devices and/or networks than illustrated in FIG. 9. For example, while not shown, environment 900 may include devices that facilitate or enable communication between various components shown in environment 900, such as routers, modems, gateways, switches, hubs, front-end interfaces, etc. Alternatively, or additionally, one or more of the devices of environment 900 may perform one or more network functions described as being performed by another one or more of the devices of environment 900. Devices of environment 900 may interconnect with each other and/or other devices via wired connections, wireless connections, or a combination of wired and wireless connections. In some implementations, one or more devices of environment 900 may be physically integrated in, and/or may be physically attached to, one or more other devices of environment 900.

UE 901 may include a computation and communication device, such as a wireless mobile communication device that is capable of communicating with RAN 910, RAN 912, and/or DN 950. UE 901 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Machine-to-Machine ("M2M") device, or another type of mobile computation and communication device. UE 901 may send traffic to and/or receive traffic (e.g., user plane traffic) from DN 950 via RAN 910, RAN 912, and/or UPF/PGW-U 935. In some embodiments, UE 901 may be communicatively coupled to, and/or may be used to interface with, hybrid recommendation system 101.

RAN 910 may be, or may include, a 5G RAN that includes one or more base stations (e.g., one or more gNBs 911), via which UE 901 may communicate with one or more other elements of environment 900. UE 901 may communicate with RAN 910 via an air interface (e.g., as provided by gNB 911). For instance, RAN 910 may receive traffic (e.g., voice call traffic, data traffic, messaging traffic, signaling traffic, etc.) from UE 901 via the air interface, and may communicate the traffic to UPF/PGW-U 935, and/or one or more other devices or networks. Similarly, RAN 910 may receive traffic intended for UE 901 (e.g., from UPF/PGW-U 935, AMF 915, and/or one or more other devices or networks) and may communicate the traffic to UE 901 via the air interface.

RAN 912 may be, or may include, a LTE RAN that includes one or more base stations (e.g., one or more eNBs 913), via which UE 901 may communicate with one or more other elements of environment 900. UE 901 may communicate with RAN 912 via an air interface (e.g., as provided by eNB 913). For instance, RAN 910 may receive traffic (e.g., voice call traffic, data traffic, messaging traffic, signaling traffic, etc.) from UE 901 via the air interface, and may communicate the traffic to UPF/PGW-U 935, and/or one or more other devices or networks. Similarly, RAN 910 may receive traffic intended for UE 901 (e.g., from UPF/PGW-U 935, SGW 917, and/or one or more other devices or networks) and may communicate the traffic to UE 901 via the air interface.

AMF 915 may include one or more devices, systems, Virtualized Network Functions ("VNFs"), etc., that perform operations to register UE 901 with the 5G network, to establish bearer channels associated with a session with UE 901, to hand off UE 901 from the 5G network to another network, to hand off UE 901 from the other network to the 5G network, manage mobility of UE 901 between RANs 910 and/or gNBs 911, and/or to perform other operations. In some embodiments, the 5G network may include multiple AMFs 915, which communicate with each other via the N14 interface (denoted in FIG. 9 by the line marked "N14" originating and terminating at AMF 915).

MME 916 may include one or more devices, systems, VNFs, etc., that perform operations to register UE 901 with the EPC, to establish bearer channels associated with a session with UE 901, to hand off UE 901 from the EPC to another network, to hand off UE 901 from another network to the EPC, manage mobility of UE 901 between RANs 912 and/or eNBs 913, and/or to perform other operations.

SGW 917 may include one or more devices, systems, VNFs, etc., that aggregate traffic received from one or more eNBs 913 and send the aggregated traffic to an external network or device via UPF/PGW-U 935. Additionally, SGW 917 may aggregate traffic received from one or more UPF/PGW-Us 935 and may send the aggregated traffic to one or more eNBs 913. SGW 917 may operate as an anchor for the user plane during inter-eNB handovers and as an anchor for mobility between different telecommunication networks or RANs (e.g., RANs 910 and 912).

SMF/PGW-C 920 may include one or more devices, systems, VNFs, etc., that gather, process, store, and/or provide information in a manner described herein. SMF/PGW-C 920 may, for example, facilitate the establishment of communication sessions on behalf of UE 901. In some embodiments, the establishment of communications sessions may be performed in accordance with one or more policies provided by PCF/PCRF 925.

PCF/PCRF 925 may include one or more devices, systems, VNFs, etc., that aggregate information to and from the 5G network and/or other sources. PCF/PCRF 925 may receive information regarding policies and/or subscriptions from one or more sources, such as subscriber databases and/or from one or more users (such as, for example, an administrator associated with PCF/PCRF 925).

AF 930 may include one or more devices, systems, VNFs, etc., that receive, store, and/or provide information that may be used in determining parameters (e.g., quality of service parameters, charging parameters, or the like) for certain applications.

UPF/PGW-U 935 may include one or more devices, systems, VNFs, etc., that receive, store, and/or provide data (e.g., user plane data). For example, UPF/PGW-U 935 may receive user plane data (e.g., voice call traffic, data traffic, etc.), destined for UE 901, from DN 950, and may forward the user plane data toward UE 901 (e.g., via RAN 910, SMF/PGW-C 920, and/or one or more other devices). In some embodiments, multiple UPFs 935 may be deployed (e.g., in different geographical locations), and the delivery of content to UE 901 may be coordinated via the N9 interface (e.g., as denoted in FIG. 9 by the line marked "N9" originating and terminating at UPF/PGW-U 935). Similarly, UPF/PGW-U 935 may receive traffic from UE 901 (e.g., via RAN 910, SMF/PGW-C 920, and/or one or more other devices), and may forward the traffic toward DN 950. In some embodiments, UPF/PGW-U 935 may communicate (e.g., via the N4 interface) with SMF/PGW-C 920, regarding user plane data processed by UPF/PGW-U 935.

HSS/UDM 940 and AUSF 945 may include one or more devices, systems, VNFs, etc., that manage, update, and/or store, in one or more memory devices associated with AUSF 945 and/or HSS/UDM 940, profile information associated with a subscriber. AUSF 945 and/or HSS/UDM 940 may perform authentication, authorization, and/or accounting operations associated with the subscriber and/or a communication session with UE 901.

DN 950 may include one or more wired and/or wireless networks. For example, DN 950 may include an Internet Protocol ("IP")-based PDN, a wide area network ("WAN") such as the Internet, a private enterprise network, and/or one or more other networks. UE 901 may communicate, through DN 950, with data servers, other UEs 901, and/or to other servers or applications that are coupled to DN 950. DN 950 may be connected to one or more other networks, such as a public switched telephone network ("PSTN"), a public land mobile network ("PLMN"), and/or another network. DN 950 may be connected to one or more devices, such as content providers, applications, web servers, and/or other devices, with which UE 901 may communicate.

Hybrid recommendation system 101 may include one or more devices, systems, VNFs, that perform one or more operations described herein. For example, hybrid recommendation system 101 may generate one or more models based on interactions with characteristic, structural, contextual, sequential, and/or other types of information. Hybrid recommendation system 101 may output recommendations for items, products, services, content, and/or other offerings that may be of interest to different users based on the generated models.

Figure 10:
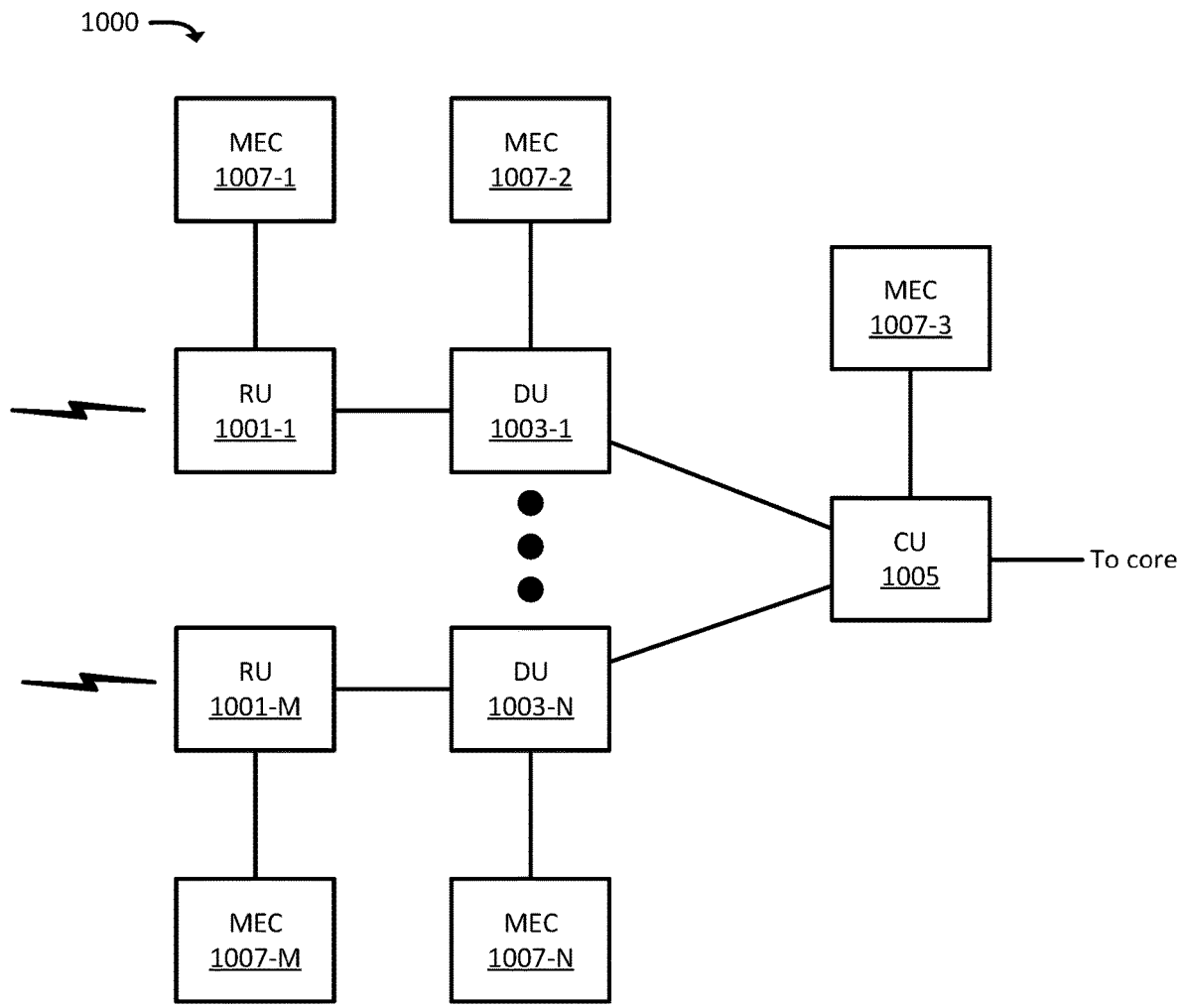
FIG. 10 illustrates an example arrangement of a Radio Access Network ("RAN"), in accordance with some embodiments.

FIG. 10 illustrates an example Distributed Unit ("DU") network 1000, which may be included in and/or implemented by one or more RANs (e.g., RAN 910, RAN 912, or some other RAN). In some embodiments, a particular RAN may include one DU network 1000. In some embodiments, a particular RAN may include multiple DU networks 1000. In some embodiments, DU network 1000 may correspond to a particular gNB 911 of a 5G RAN (e.g., RAN 910). In some embodiments, DU network 1000 may correspond to multiple gNBs 911. In some embodiments, DU network 1000 may correspond to one or more other types of base stations of one or more other types of RANs. As shown, DU network 1000 may include Central Unit ("CU") 1005, one or more Distributed Units ("DUs") 1003-1 through 1003-N (referred to individually as "DU 1003," or collectively as "DUs 1003"), and one or more Radio Units ("RUs") 1001-1 through 1001-M (referred to individually as "RU 1001," or collectively as "RUs 1001").

CU 1005 may communicate with a core of a wireless network (e.g., may communicate with one or more of the devices or systems described above with respect to FIG. 9, such as AMF 915 and/or UPF/PGW-U 935). In the uplink direction (e.g., for traffic from UEs 901 to a core network), CU 1005 may aggregate traffic from DUs 1003, and forward the aggregated traffic to the core network. In some embodiments, CU 1005 may receive traffic according to a given protocol (e.g., Radio Link Control ("RLC")) from DUs 1003, and may perform higher-layer processing (e.g., may aggregate/process RLC packets and generate Packet Data Convergence Protocol ("PDCP") packets based on the RLC packets) on the traffic received from DUs 1003.

In accordance with some embodiments, CU 1005 may receive downlink traffic (e.g., traffic from the core network) for a particular UE 901, and may determine which DU(s) 1003 should receive the downlink traffic. DU 1003 may include one or more devices that transmit traffic between a core network (e.g., via CU 1005) and UE 901 (e.g., via a respective RU 1001). DU 1003 may, for example, receive traffic from RU 1001 at a first layer (e.g., physical ("PHY") layer traffic, or lower PHY layer traffic), and may process/aggregate the traffic to a second layer (e.g., upper PHY and/or RLC). DU 1003 may receive traffic from CU 1005 at the second layer, may process the traffic to the first layer, and provide the processed traffic to a respective RU 1001 for transmission to UE 901.

RU 1001 may include hardware circuitry (e.g., one or more RF transceivers, antennas, radios, and/or other suitable hardware) to communicate wirelessly (e.g., via an RF interface) with one or more UEs 901, one or more other DUs 1003 (e.g., via RUs 1001 associated with DUs 1003), and/or any other suitable type of device. In the uplink direction, RU 1001 may receive traffic from UE 901 and/or another DU 1003 via the RF interface and may provide the traffic to DU 1003. In the downlink direction, RU 1001 may receive traffic from DU 1003, and may provide the traffic to UE 901 and/or another DU 1003.

RUs 1001 may, in some embodiments, be communicatively coupled to one or more Multi-Access/Mobile Edge Computing ("MEC") devices, referred to sometimes herein simply as "MECs" 1007. For example, RU 1001-1 may be communicatively coupled to MEC 1007-1, RU 1001-M may be communicatively coupled to MEC 1007-M, DU 1003-1 may be communicatively coupled to MEC 1007-2, DU 1003-N may be communicatively coupled to MEC 1007-N, CU 1005 may be communicatively coupled to MEC 1007-3, and so on. MECs 1007 may include hardware resources (e.g., configurable or provisionable hardware resources) that may be configured to provide services and/or otherwise process traffic to and/or from UE 901, via a respective RU 1001.

For example, RU 1001-1 may route some traffic, from UE 901, to MEC 1007-1 instead of to a core network (e.g., via DU 1003 and CU 1005). MEC 1007-1 may process the traffic, perform one or more computations based on the received traffic, and may provide traffic to UE 901 via RU 1001-1. In this manner, ultra-low latency services may be provided to UE 901, as traffic does not need to traverse DU 1003, CU 1005, and an intervening backhaul network between DU network 1000 and the core network. In some embodiments, MEC 1007 may include, and/or may implement, some or all of the functionality described above with respect to hybrid recommendation system 101.

Figure 11:
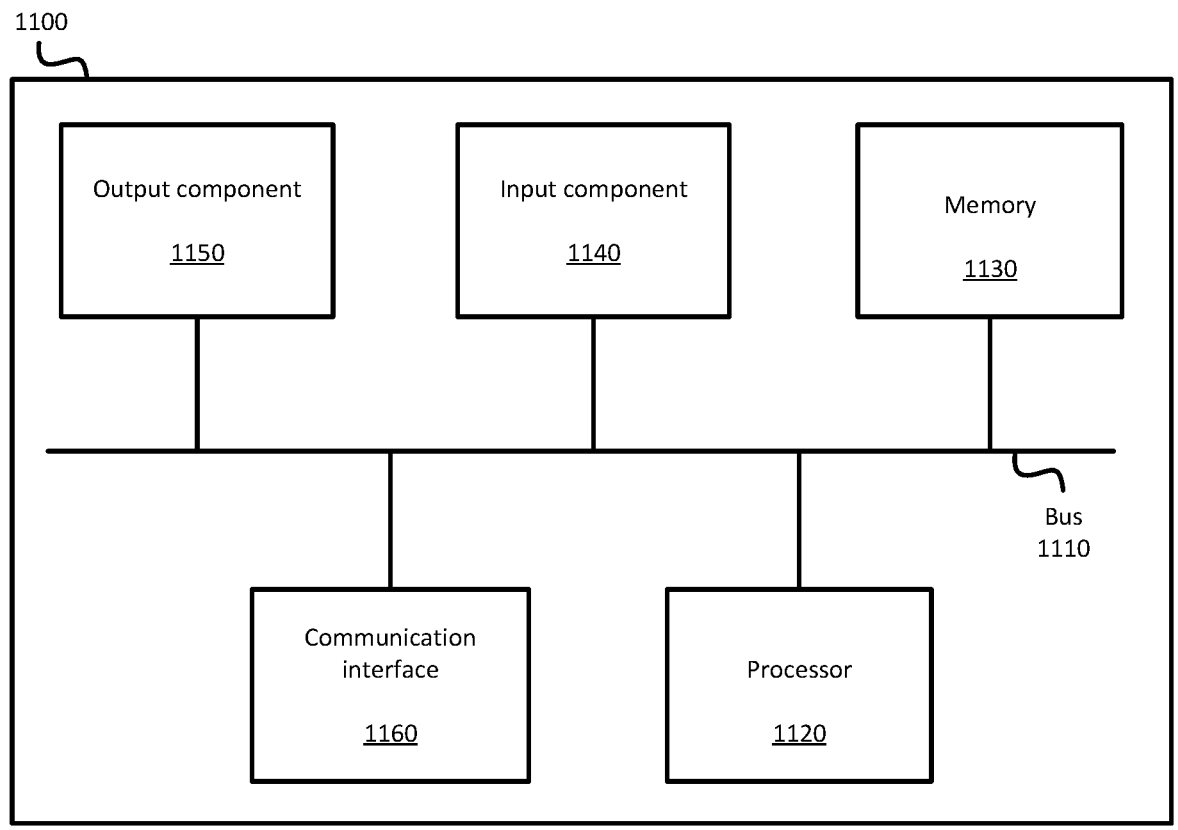
FIG. 11 illustrates example components of one or more devices, in accordance with one or more embodiments described herein.

FIG. 11 illustrates example components of device 1100. One or more of the devices described above may include one or more devices 1100. Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100 and/or other receives or detects input from a source external to 1140, such as a touchpad, a touchscreen, a keyboard, a keypad, a button, a switch, a microphone or other audio input component, etc. In some embodiments, input component 1140 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1150 may include a mechanism that outputs information to the operator, such as a display, a speaker, one or more light emitting diodes ("LEDs"), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations relating to one or more processes described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-8), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
model, within a first neural network, a first set of relationships between a plurality of different users and one or more items based on a plurality of interactions by the plurality of users, wherein modeling the first set of relationships comprises generating a first matrix with a first set of normalized values representing the first set of relationships;
model a second set of relationships from the plurality of interactions within a second neural network, wherein the first set of relationships comprises a first set of characteristic or structural data associated with the plurality of interactions, and wherein the second set of relationships comprises a second set of characteristic, contextual, or sequential data associated with the plurality of interactions, wherein modeling the second set of relationships comprises generating a second matrix with a second set of normalized values representing the second set of relationships;
track activities by one or more users of the plurality of users;
generate a personalized model via collaborative filtering of the activities by the one or more users;
integrate the personalized model into the modeling of the first set of relationships;
generate a recommendation matrix with a plurality of vectors that rank a plurality of candidate items based on combined sets of probability values resulting from integrating the personalized model into the modeling of the first set of relationships, wherein generating the recommendation matrix comprises concatenating the first matrix, the second matrix, and a matrix derived from the personalized model; and
modify a user interface ("UI") to present one or more of the plurality of candidate items based on one or more of the plurality of vectors that rank the one or more candidate items higher than other items from the plurality of candidate items.

2. The device of claim 1, wherein integrating the personalized model comprises:
providing an output from the collaborative filtering as additional input to the first neural network.

3. The device of claim 1, wherein integrating the personalized model comprises:
combining the personalized model with a different model that is based on the first set of relationships.

4. The device of claim 1, wherein generating the recommendation matrix comprises:
calculating the probability values from combining different subsets of the first set of relationships with different subsets of the second set of relationships.

5. The device of claim 1, wherein the one or more processors are further configured to:
model one or more of characteristic and structural relationships using a Convolutional Neural Network ("CNN"),
wherein modeling the first set of relationships comprises modeling sequential relationships using a Recurrent Neural Network ("RNN").

6. The device of claim 1, wherein generating the personalized model comprises:
identifying a fourth matrix;
decomposing the fourth matrix into two or more matrices using matrix factorization; and
generating the personalized model based on a third set of relationships extracted from the two or more matrices.

7. A non-transitory computer-readable medium, storing a plurality of processor-executable instructions to:
model, within a first neural network, a first set of relationships between a plurality of different users and one or more items based on a plurality of interactions by the plurality of users, wherein modeling the first set of relationships comprises generating a first matrix with a first set of normalized values representing the first set of relationships;
model a second set of relationships from the plurality of interactions within a second neural network, wherein the first set of relationships comprises a first set of characteristic or structural data associated with the plurality of interactions, and wherein the second set of relationships comprises a second set of characteristic, contextual, or sequential data associated with the plurality of interactions, wherein modeling the second set of relationships comprises generating a second matrix with a second set of normalized values representing the second set of relationships;
track activities by one or more users of the plurality of users;
generate a personalized model via collaborative filtering of the activities by the one or more users;
integrate the personalized model into the modeling of the first set of relationships;
generate a recommendation matrix with a plurality of vectors that rank a plurality of candidate items based on combined sets of probability values resulting from integrating the personalized model into the modeling of the first set of relationships, wherein generating the recommendation matrix comprises concatenating the first matrix, the second matrix, and a matrix derived from the personalized model; and
modify a user interface ("UI") to present one or more of the plurality of candidate items based on one or more of the plurality of vectors that rank the one or more candidate items higher than other items from the plurality of candidate items.

8. The non-transitory computer-readable medium of claim 7, wherein integrating the personalized model comprises:
providing an output from the collaborative filtering as additional input to the first neural network.

9. The non-transitory computer-readable medium of claim 7, wherein integrating the personalized model comprises:
combining the personalized model with a different model that is based on the first set of relationships.

10. The non-transitory computer-readable medium of claim 7, wherein generating the recommendation matrix comprises:
calculating the probability values from combining different subsets of the first set of relationships with different subsets of the second set of relationships.

11. A method, comprising:
modeling, within a first neural network, a first set of relationships between a plurality of different users and one or more items based on a plurality of interactions by the plurality of users, wherein modeling the first set of relationships comprises generating a first matrix with a first set of normalized values representing the first set of relationships;
modeling a second set of relationships from the plurality of interactions within a second neural network, wherein the first set of relationships comprises a first set of characteristic or structural data associated with the plurality of interactions, and wherein the second set of relationships comprises a second set of characteristic, contextual, or sequential data associated with the plurality of interactions, wherein modeling the second set of relationships comprises generating a second matrix with a second set of normalized values representing the second set of relationships;

tracking activities by one or more users of the plurality of users;

generating a personalized model via collaborative filtering of the activities by the one or more users;

integrating the personalized model into the modeling of the first set of relationships;

generating a recommendation matrix with a plurality of vectors that rank a plurality of candidate items based on combined sets of probability values resulting from integrating the personalized model into the modeling of the first set of relationships, wherein generating the recommendation matrix comprises concatenating the first matrix, the second matrix, and a matrix derived from the personalized model; and modifying a user interface ("UI") to present one or more of the plurality of candidate items based on one or more of the plurality of vectors that rank the one or more candidate items higher than other items from the plurality of candidate items.

12. The non-transitory computer-readable medium of claim 7, wherein the plurality of processor-executable instructions further include processor-executable instructions to:

model one or more of characteristic and structural relationships using a Convolutional Neural Network ("CNN"), wherein modeling the first set of relationships comprises modeling sequential relationships using a Recurrent Neural Network ("RNN").

13. The non-transitory computer-readable medium of claim 7, wherein generating the personalized model comprises:

identifying a fourth matrix;

decomposing the fourth matrix into two or more matrices using matrix factorization; and generating the personalized model based on a third set of relationships extracted from the two or more matrices.

14. The non-transitory computer-readable medium of claim 13, wherein generating the recommendation matrix comprises:

using an Alternate Least Squares ("ALS") technique for the matrix factorization.

15. The method of claim 11, wherein generating the recommendation matrix comprises:

calculating the probability values from combining different subsets of the first set of relationships with different subsets of the second set of relationships.

16. The method of claim 11, wherein integrating the personalized model comprises:

providing an output from the collaborative filtering as additional input to the first neural network.

17. The method of claim 11, wherein integrating the personalized model comprises combining the personalized model with a different model that is based on the first set of relationships.

18. The method of claim 11, further comprising:

modeling one or more of characteristic and structural relationships using a Convolutional Neural Network ("CNN"), wherein modeling the first set of relationships comprises modeling sequential relationships using a Recurrent Neural Network ("RNN").

19. The method of claim 11, wherein generating the personalized model comprises:

identifying a fourth matrix;

decomposing the fourth matrix into two or more matrices using matrix factorization; and generating the personalized model based on a third set of relationships extracted from the two or more matrices.

20. The method of claim 19, wherein generating the recommendation matrix comprises:

using an Alternate Least Squares ("ALS") technique for the matrix factorization.

* * * * *